United States Patent
Chen

(10) Patent No.: US 10,079,840 B2
(45) Date of Patent: Sep. 18, 2018

(54) PROTECTION METHOD AND COMPUTER SYSTEM OF RELEASING MALWARE ATTACKS FOR NETWORK INTERFACE CONTROLLER SYSTEM

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 292 days.

(21) Appl. No.: 14/830,747

(22) Filed: Aug. 20, 2015

(65) Prior Publication Data

US 2016/0261617 A1    Sep. 8, 2016

(30) Foreign Application Priority Data

Mar. 5, 2015    (TW) .............................. 104107063 A

(51) Int. Cl.
   *H04L 29/06*    (2006.01)

(52) U.S. Cl.
   CPC ........ *H04L 63/1416* (2013.01); *H04L 63/145* (2013.01)

(58) Field of Classification Search
   CPC . H04L 41/0681; H04L 69/22; H04L 41/0803; H04L 43/028; G06F 21/552
   USPC ........................................................ 726/23
   See application file for complete search history.

(56) References Cited

U.S. PATENT DOCUMENTS

| | | | | |
|---|---|---|---|---|
| 7,783,784 B1* | 8/2010 | Droux | ................. | H04L 41/0803 709/250 |
| 8,595,835 B2* | 11/2013 | Kolton | ................. | G06F 21/552 713/151 |
| 8,856,518 B2* | 10/2014 | Sridharan | ............. | H04L 45/586 713/162 |
| 2004/0146006 A1* | 7/2004 | Jackson | ............. | H04L 41/0681 370/230 |
| 2004/0179546 A1* | 9/2004 | McDaniel | ............. | H04L 43/028 370/463 |
| 2012/0213118 A1* | 8/2012 | Lindsay | .................. | H04L 12/12 370/254 |
| 2013/0019042 A1* | 1/2013 | Ertugay | ................ | G06F 13/385 710/267 |

* cited by examiner

*Primary Examiner* — Eleni A Shiferaw
*Assistant Examiner* — Bryan Wright
(74) *Attorney, Agent, or Firm* — Winston Hsu

(57) ABSTRACT

A protection method, which releases an attack of a malware to a network interface controller (NIC) system, includes processing a microbatching operation in a plurality of session channels at at least an operational period according to at least one input information, to generate a plurality of session-specific NIC patterns of the plurality of session channels; and merging the plurality of session-specific NIC patterns to generate an application-specific NIC pattern at an application layer, so as to dispose a script information corresponding to the application-specific NIC pattern in the NICs for releasing the attack of the malware, wherein the microbatching operation is processed to generate a plurality of independent subset-specific NIC pattern in each session channel, so as to generate the session-specific NIC pattern corresponding to each session channel.

18 Claims, 4 Drawing Sheets

PROTECTION METHOD AND COMPUTER SYSTEM OF RELEASING MALWARE ATTACKS FOR NETWORK INTERFACE CONTROLLER SYSTEM

BACKGROUND OF THE INVENTION

1. Field of the Invention

The present invention relates to a protection method and a computer system thereof applied to a network interface controller (NIC) system, and more particularly, to a protection method and a computer system thereof which simultaneously refers to all transmission information in a plurality of session channels for protecting the NIC system.

2. Description of the Prior Art

During the network service rapidly developing, people are used to highly rely on the network information, which results in the entrance of a variety of malware, e.g. virus, spyware, adware or spam, through the related network services to hack or attack people's computer systems, mobile devices or other electronic devices connecting to the network for processing some applications (e.g. smart watch). Accordingly, software/hardware of the computer systems or mobile devices could be damaged, and some electronic files therein might be stolen.

To strengthen the protection of the computer system or the mobile device, a NIC system with related antivirus software may be utilized to recognize or isolate the potential malware. For the rapid and unpredictable changes of program codes of the malware, the antivirus software of the computer system and the mobile device must be timely updated in order to download the latest virus pattern information. Besides, the prior art only processes the detection in single session channel of the session layer of the OSI Model (Open System Interconnection Reference Model), and many advanced malware or virus could cleverly divide/separate its transmission packets into many sub-packets to be transmitted in different session channels of the session layer, so as to avoid the detection of the related antivirus software. Accordingly, the related antivirus software may be difficult to precisely recognize/detect/isolate all the sub-packets indifferent session channels of the session layer, such that the electronic devices receiving the information via the application layer may be possible defected or attacked by the potential malware.

Therefore, it has become an important issue to provide a protection method and a computer system thereof for the NIC system, so as to release the attack of potential malware.

SUMMARY OF THE INVENTION

Therefore, the primary objective of the present invention is to provide a protection method and a computer system thereof for the NIC system, so as to release the attack of potential malware.

The present invention discloses a protection method utilized for releasing an attack of a malware to a network interface controller (NIC) system, which is coupled to an application layer and comprises a status register, a plurality of NICs and a cluster controller. The protection method comprises processing a microbatching operation in a plurality of session channels at at least an operational period according to at least one input information, to generate a plurality of session-specific NIC patterns of the plurality of session channels; and merging the plurality of session-specific NIC patterns to generate an application-specific NIC pattern at the application layer, so as to dispose a script information corresponding to the application-specific NIC pattern in the NICs for releasing the attack of the malware; wherein the microbatching operation processes a pattern recombination operation in each session channel to generate a plurality of independent subset-specific NIC patterns, so as to generate the session-specific NIC pattern corresponding to each session channel in view of the plurality of subset-specific NIC patterns.

The present invention further discloses a computer system, coupled to a network interface controller (NIC) system disposed at an application layer for releasing an attack of a malware to the NIC system, the NIC system comprising a status register, a plurality of NICs and a cluster controller. The computer system comprises a processing unit; and a storage device, coupled to the processing unit and storing a program code for processing a protection method. The protection method comprises processing a microbatching operation in a plurality of session channels at at least an operational period according to at least one input information, to generate a plurality of session-specific NIC patterns of the plurality of session channels; and merging the plurality of session-specific NIC patterns to generate an application-specific NIC pattern at the application layer, so as to dispose a script information corresponding to the application-specific NIC pattern in the NICs for releasing the attack of the malware; wherein the microbatching operation processes a pattern recombination operation in each session channel to generate a plurality of independent subset-specific NIC patterns, so as to generate the session-specific NIC pattern corresponding to each session channel in view of the plurality of subset-specific NIC patterns.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in sub-module. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
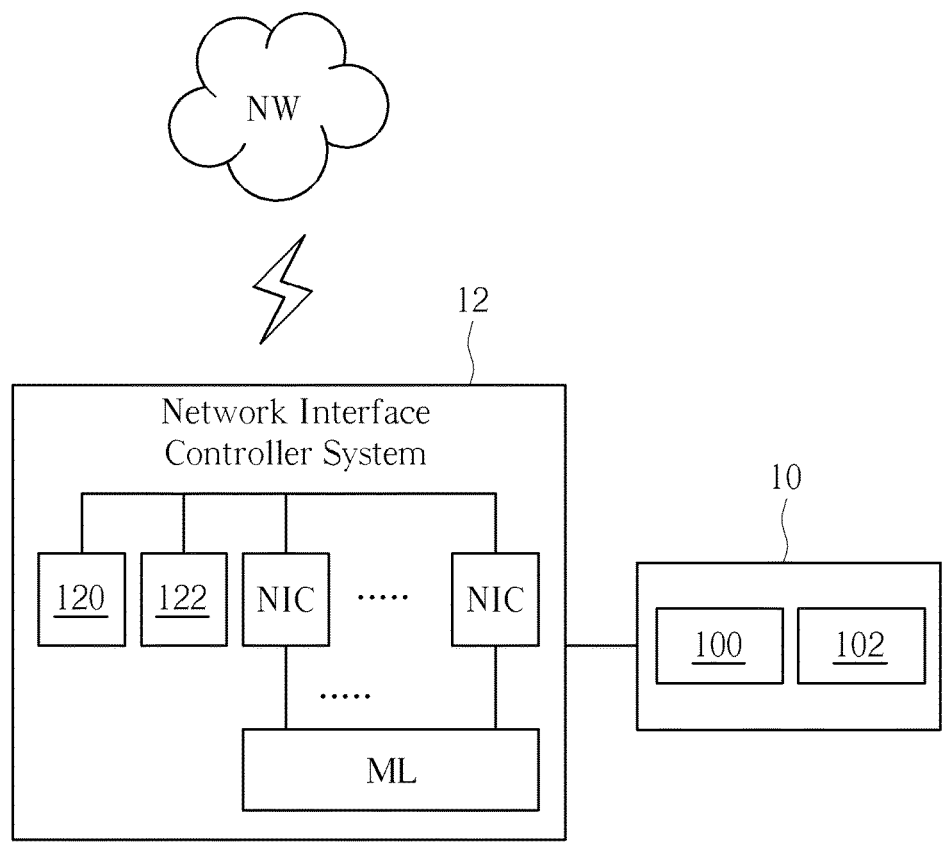
FIG. 1 illustrates a schematic diagram of a computer system coupled to a NIC system according to an embodiment of the invention.

Please refer to FIG. 1, which illustrates a schematic diagram of a computer system 10 coupled to a NIC system 12 according to an embodiment of the invention. The computer system 10 of the embodiment has a basic structure comprising a main board, a processing unit, a memory, a hard disk, a south-bridge module, a north-bridge module, and etc., and should be well known to those skilled in the art. For the brevity, FIG. 1 of the invention only illustrates a processing unit 100 and a storage device 102. The storage device 102 can be, but not limited to, read-only memory (ROM), random-access memory (RAM), flash, floppy disk, hardware disk, compact disc, USB flash drive, tape, database accessed via the internet, or other types of storage medium known to those skilled in the art, to store a program code, such that the processing unit 100 can process the program code to operate a protection method for the NIC system 12. The NIC system 12 is utilized to connect the computer system 10 with a network NW, and cooperates with operations of multiple layers of the OSI model (such as the application layer and the session layer) for processing the transmission data therein, such that the computer system 10 can access the network NW.

In the embodiment, the NIC system 12 comprises a status register 120, a plurality of NICs, a cluster controller 122 and a machine learning model ML. Preferably, the status register 120 is coupled to the plurality of NICs for recording a plurality of status information of the NICs, i.e. determining whether the NIC(s) is functionally operated or not. The cluster controller 122 is coupled to the plurality of NICs for turning on or off a plurality of data channels corresponding to the plurality of NICs according to the plurality of status information, a network loading information or a controlling command, and at least one or more turned-on data channel(s) can be utilized to transmit or receive the input information from the network NW. The machine learning module ML can process a machine learning operation in view of network transmission data, and cooperates with hardware elements, software programs or firmware modules inside the computer system 10 and the NIC system 12 to process the protection method, so as to release the attack or invasion of the malware (such as virus, spyware, adware or spam) to the computer system 10 and the NIC system 12 via the network NW.

In detail, the NIC system 12 of the embodiment integrates a plurality of NICs, and the cluster controller 122 correspondingly controls the data transmission/reception of the plurality of NICs in view of the network loading information and controlling command(s) from a user. When the user processes a larger volume of transmission data, the cluster controller 122 will correspondingly turn on more NICs to share the transmission. When the user processes a smaller volume of transmission data, the cluster controller 122 will correspondingly turn off some unnecessary NICs to have fewer NICs for processing the transmission. Certainly, the cluster controller 122 can also adaptively replace the malfunction NIC according to the status information stored inside the status register 120. Accordingly, the cluster controller 122 of the embodiment can dynamically adjust the utilization number of the NICs for processing different volumes of the transmission data.

Besides, the plurality of NICs share one data channel (not shown in the figure), which is utilized to transmit or receive a transmission data from another NIC system (not shown in the figure). In other words, the NIC of the embodiment does not need to initially choose one data channel for its corresponding transmission. Instead, a flexible number of the data channels can be predetermined to adaptively arrange the combination of the NICs and their data channels in view of the practical utilization number of the NICs. When the utilization number of the NICs is larger, the utilization number of the data channel will be increased and a transmission bandwidth of each data channel will be adaptively decreased. When the utilization number of the NICs is smaller, the utilization number of the data channel will be decreased and the transmission bandwidth of each data channel will be adaptively increased for improving the transmission efficiency of the network.

Certainly, the transmission between the computer system 10 and the NIC system 12 can be a wireless transmission or a wired transmission. The program code corresponding to the protection method can be adaptively stored in a storage unit of the NIC system 12, such that the NIC system 12 can independently process the protection method, which is also within the scope of the invention. Besides, the embodiment of the invention separately depicts the computer system 10 and the NIC system 12 with the connection relationship, and in other embodiments, the NIC system 12 can also be adaptively integrated into the computer system 10 to collaboratively process the transmission data via the network, which is not limiting the scope of the invention.

In the embodiment of the invention, the malware can be obtained from a computing device, a remote storage device, an application or a network information, and the malware may also be generated through the case as delivering/accessing electronic files from the Network NW, processing/installing specific applications, or browsing certain webpages, etc. Additionally, the computer system 10 and the NIC system 12 of the embodiment have installed the related antivirus software/program, which may utilize a virus database including a plurality of recognized information for preliminarily detect/recognize the partial or all pattern information of the malware.

In the prior art, it only detects the transmission packets transmitted in single session channel of the session layer, such that it is impossible to simultaneously compare or examine all the transmission packets in every session channels. In comparison, the protection method of the embodiment can be operated in the plurality of session channels of the OSI model to simultaneously examine or detect the transmission packets thereof. Further, the embodiment of the invention also cooperates with a structured prediction machine learning model (i.e. being similar to the machine learning module ML in FIG. 1) for predicting, learning or training operations, and the structured prediction machine learning model is configured in each session channel. Accordingly, all the transmission packets in every session channels may process a microbatching operation to automatically predict, learn or train all/partial pattern information of the potential malware, so as to transmit the predicted, learned or trained results to the top application layer of the OSI model for further analysis, integration and combination operation. Also, a protection or defense mechanism/operation corresponding to the predicted, learned or trained results may be applied to the NIC system 12, so as to release the attack or invasion of the potential malware. The structured prediction machine learning model of the embodiment can be realized as a software or hardware implementation to be cooperated inside the computer system 10 or the NIC system 12, which is not limiting the scope of the invention.

Certainly, in order to assisting all the session channels to simultaneously process the predicting, learning or training operation for the transmission packets, the computer system 10 of the embodiment can be regarded as one combination/assembling unit of a plurality of computer modules, i.e. each computer module comprises a central processing unit (or a graphic processing unit) and a storage unit to independently process the microbatching operation for each session channel, and the plurality of computer modules are connected to each other (via a wireless communication or a wired communication) to share the predicted, learned or trained results. More detailed operations of the protection method are discussed in the following paragraphs.

Figure 2:
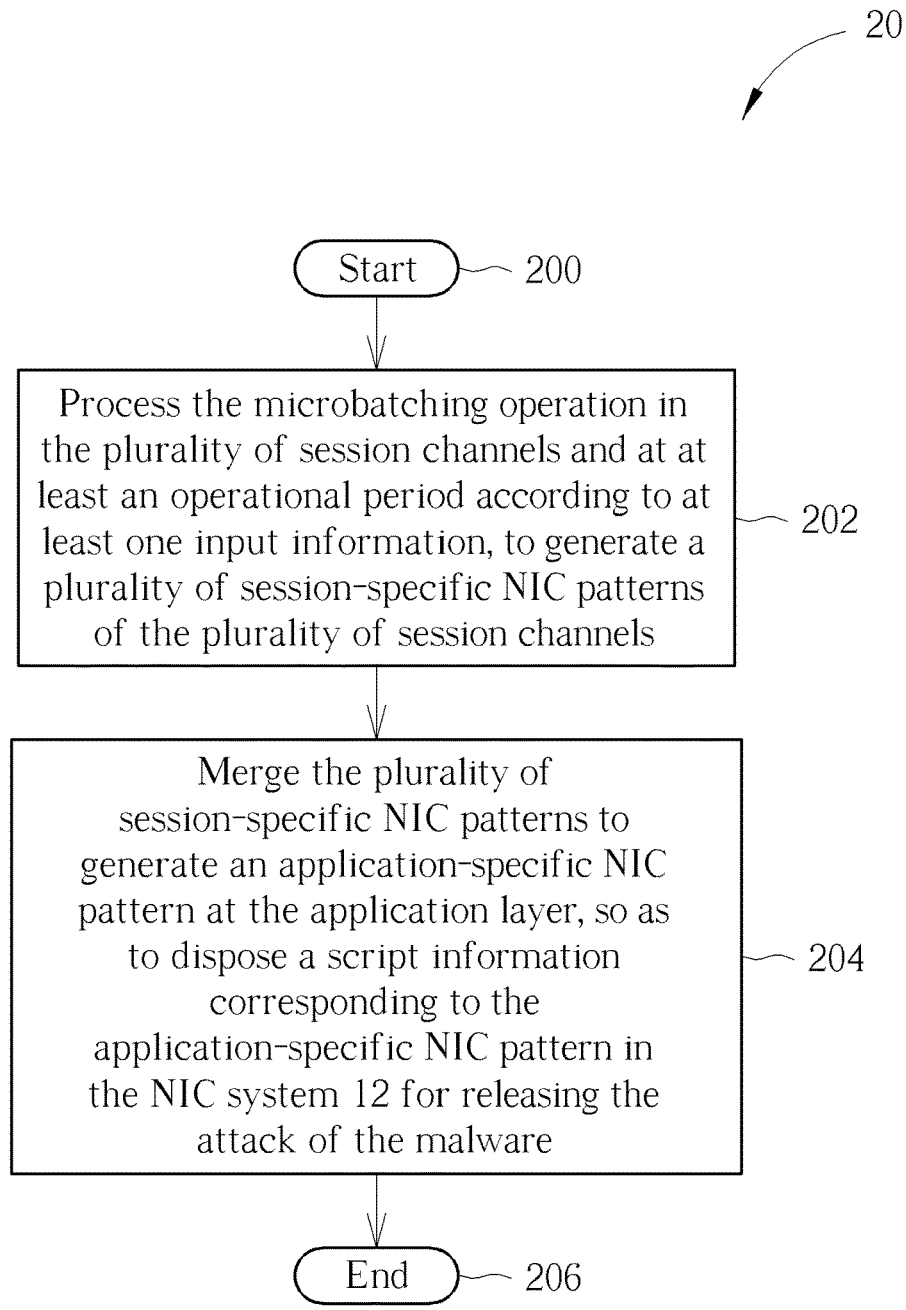
FIG. 2 illustrates a flowchart diagram of a protection process according to an embodiment of the invention.

Further, the protection method for the NIC system 12 of the invention can be summarized as a protection process 20 to be stored as the program code in the storage device 102 (or in the storage unit of the NIC system 12). The protection process 20, as shown in FIG. 2, of the invention comprises the following steps:

Step 200: Start.

Step 202: Process the microbatching operation in the plurality of session channels and at at least an operational period according to at least one input information, to generate a plurality of session-specific NIC patterns of the plurality of session channels.

Step 204: Merge the plurality of session-specific NIC patterns to generate an application-specific NIC pattern at the application layer, so as to dispose a script information corresponding to the application-specific NIC pattern in the NIC system 12 for releasing the attack of the malware.

Step 206: End.

In the embodiment, if the user utilizes the computer system 10 and the NIC system 12 to connect to the Network NW, the protection process 20 (i.e. step 200) may be correspondingly initiated, and the computer system 10 is allowed to receive at least one input information from the network NW. Certainly, the computer system 10 and the NIC system 12 of the embodiment have installed the antivirus software and related programs, which can periodically process the updating operation to download the latest virus pattern information for maintaining the virus database inside the computer system 10 and the NIC system 12 being the latest virus pattern information, such that the computer system 10 (or the NIC system 12) can pre-store the latest virus pattern information in advance for the following operations.

In step 202, the central processing unit 100 may process the microbatching operation inside each session channel of the session layer in the OSI model according to the received input information at the first operation period, to generate the plurality of session-specific NIC patterns of the plurality of session channels. Preferably, the embodiment of the invention has disposed many central processing units (or the graphic processing units) to simultaneously process the microbatching operation for the plurality of session channels, so as to precisely and rapidly predict the plurality of independent session-specific NIC patterns and improve the processing efficiency as well as the learning/updating speed of the protection process 20. Due to the design of the OSI model, the input information of the embodiment can be regarded as the communication information of the plurality of applications between the computer system 10 and the network NW, and a transmission path thereof is virtually established via the plurality of session channels between the computer system 10 and the network NW, such that the dissipation of the transmission information between the computer system 10 and the network NW may be initiated for transmitting the related transmission packets. Other detailed operations/mechanisms between other layers in the OSI model are not the main scope of the invention, and will be neglected for brevity.

Figure 3:
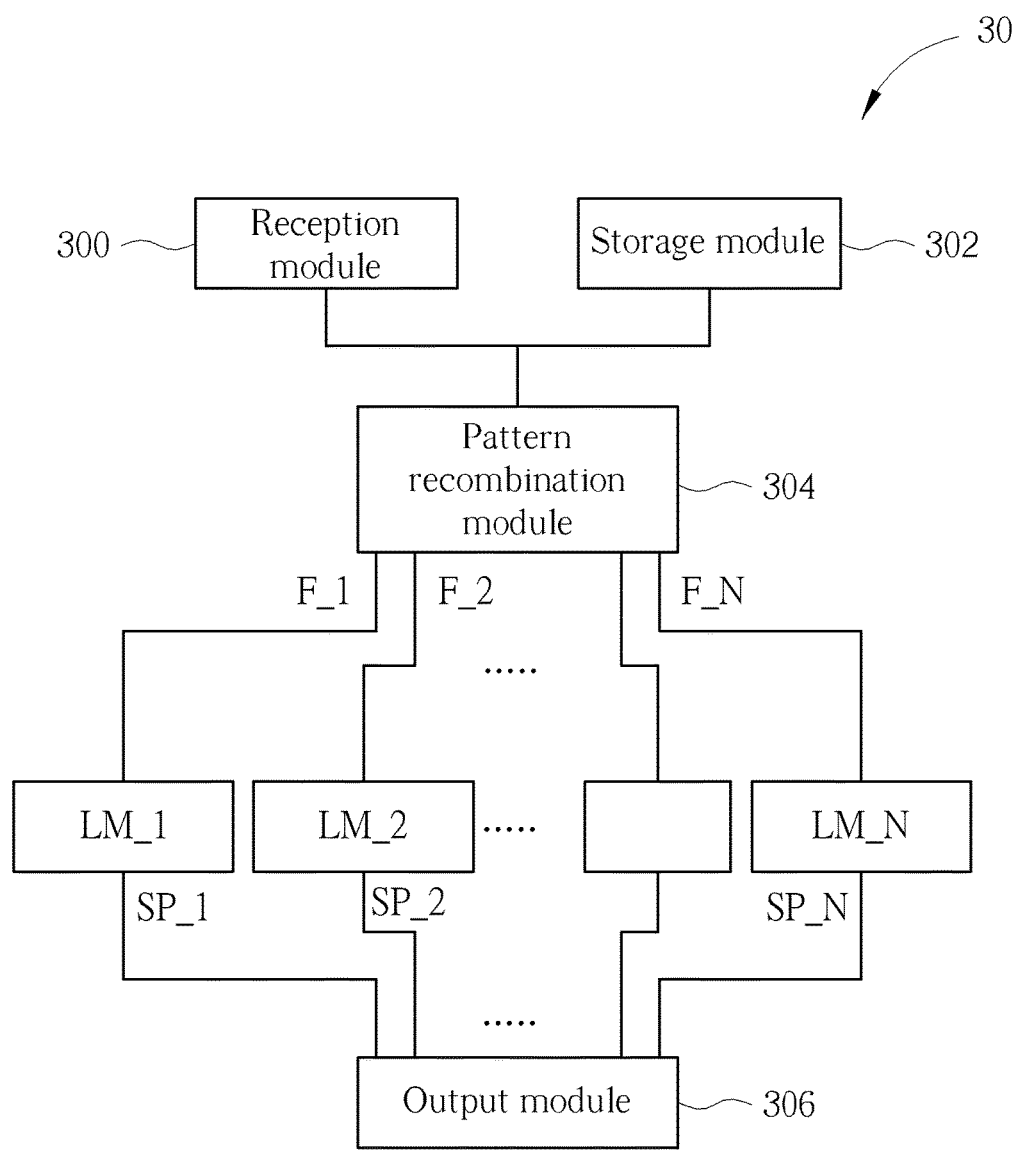
FIG. 3 illustrates a schematic diagram of a session channel module according to an embodiment of the invention.

For the convenience, the following embodiment will demonstrate one session channel module in the OSI model to detailed explain how the microbatching operation is operated in each session channel. Please refer to FIG. 3, which illustrates a schematic diagram of a session channel module 30 according to an embodiment of the invention. As shown in FIG. 3, the session channel module 30 of the embodiment comprises a reception module 300, a storage module 302, a pattern recombination module 304, structured prediction machine learning modules LM_1-LM_N and an output module 306. The reception module 300 is utilized to receive the input information from the network NW, and correspondingly retrieve at least one input pattern information from the input information. The storage module 302 is utilized to store the pre-stored pattern information, which is utilized to recognize the virus pattern information of the malware with the timely updating operation. The pattern recombination module 304 is coupled to the reception module 300, a storage module 302 and the structured prediction machine learning modules LM_1-LM_N, to correspondingly receive the input pattern information and the pre-stored pattern information for processing the pattern recombination operation, i.e. the pattern recombination module 304 will merge the input pattern information and the pre-stored pattern information to generate the updating pattern information, and the updating pattern information can be a plurality of independent subset-specific patterns F_1-F_N. For example, each subset-specific pattern can represent one type of the classification cluster information, such as individual health information, personal hobby information, family background information, or career/occupation information, and all the classification cluster information are independent to each other with no correlation/overlapping information. Accordingly, after the pattern recombination operation is completed, the pattern recombination module 304 may correspondingly output the classified subset-specific patterns F_1-F_N to the structured prediction machine learning modules LM_1-LM_N.

Further, each structured prediction machine learning module in the session channel module 30 may refer to the classified subset-specific patterns F_1-F_N to process the automatic predicting, learning and training operation. For example, the subset-specific patterns F_1-F_N may be inputted into a joint feature function for co-learning/training operation, to predict partial or all pattern information of the potential malware, so as to generate the session-specific NIC patterns SP_1-SP_N to the output module 306. The co-learning/training operation of the joint feature function in the embodiment can be processed, for example, via operations/computations of the transductive machine learning and the inductive machine learning, which is not limiting the scope of the invention.

Certainly, in another embodiment, every structured prediction machine learning module in the session channel module 30 can also obtain subset-specific NIC patterns from other structured prediction machine learning modules for assisting a generation of another subset-specific NIC pattern at another operational period (e.g. a second operational period). In other words, different structured prediction machine learning modules share the subset-specific NIC patterns with each other, to compare, analyze or integrate with the subset-specific NIC pattern generated by itself, so as to improve the efficiency and accuracy of the co-learning/training operation, such that another subset-specific NIC pattern may be precisely generated or predicted (or with a higher prediction possibility) in the next operational period to be outputted to the output module 306, which is also in the scope of the invention.

Moreover, the output module 306 of the embodiment is coupled to receive the subset-specific NIC patterns SP_1-SP_N from the structured prediction machine learning modules LM_1-LM_N, so as to integrate and compare correlations of the subset-specific NIC patterns SP_1-SP_N for generating the session-specific NIC pattern of each session channel. In detail, the output module 306 of the embodiment retrieves partial patterns or all patterns from one or many subset-specific NIC patterns SP_1-SP_N to generate the session-specific NIC pattern of each session channel according to similarities, overlapping degrees or differences of the plurality of subset-specific NIC patterns SP_1-SP_N, so as to transmit the plurality of session-specific NIC patterns to the application layer for following operations.

Similarly, in another embodiment, each session channel of the session channel module 30 can receive the session-specific NIC patterns corresponding to other session channels for assisting a generation of another session-specific NIC pattern at another operational period. In other words, after the microbatching operation is completed, the computer modules corresponding to different session channels can share the session-specific NIC patterns with each other, to compare, analyze or integrate with the session-specific NIC pattern generated by itself, so as to improve the efficiency and accuracy of the co-learning/training operation, such that another session-specific NIC pattern may be precisely generated or predicted in the next operational period (or with a higher prediction possibility) for the following operations of the application layer, which is also in the scope of the invention.

Figure 4:
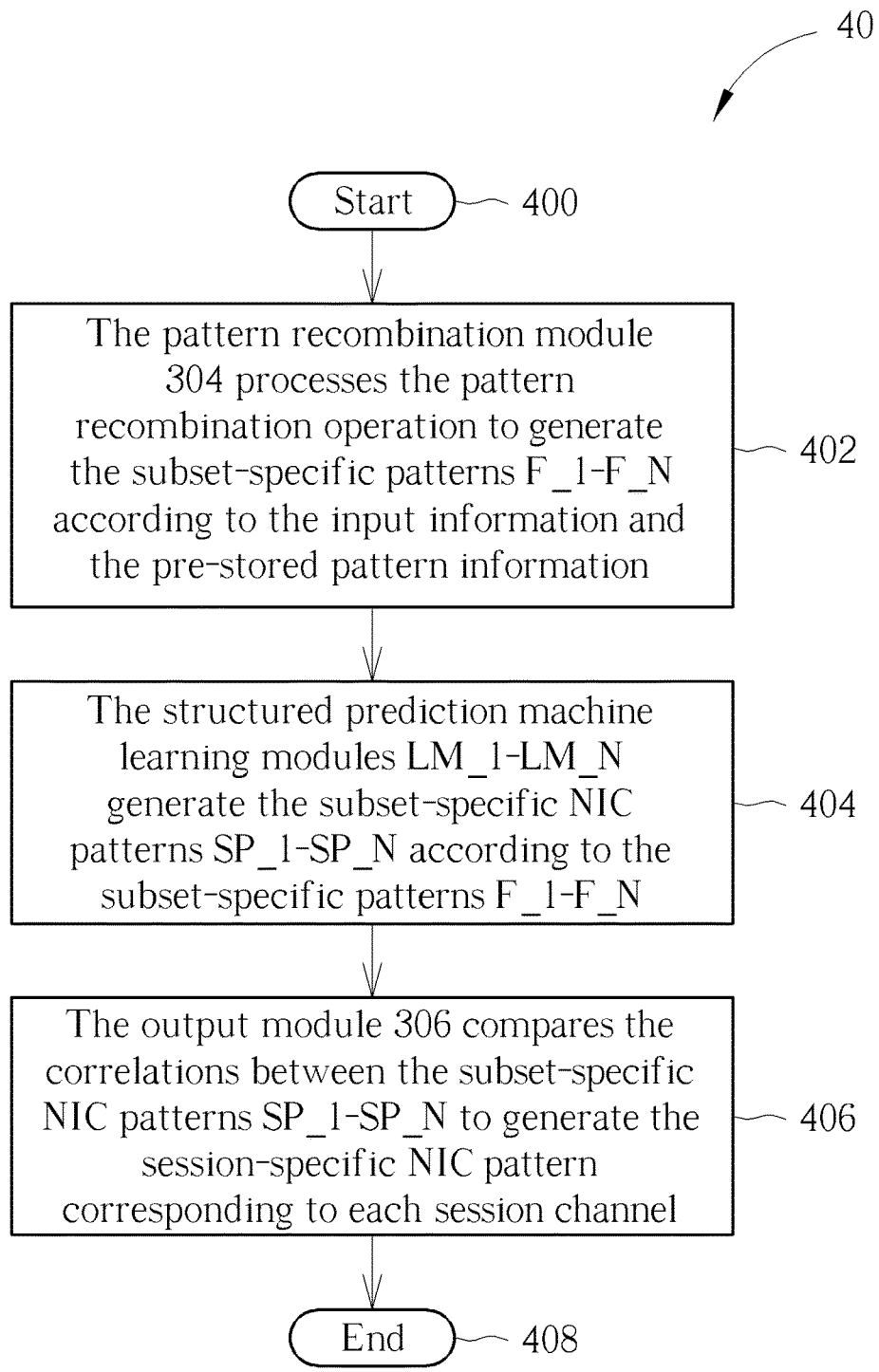
FIG. 4 illustrates a flowchart diagram of a microbatching process according to an embodiment of the invention.

Certainly, each session channel processing the microbatching operation can also be summarized as a microbatching process 40 to be stored as the program code in the storage device 102 (or in the storage unit of the NIC system 12). The microbatching process 40, as shown in FIG. 4, of the invention comprises the following steps:

Step 400: Start.

Step 402: The pattern recombination module 304 processes the pattern recombination operation to generate the subset-specific patterns F_1-F_N according to the input information and the pre-stored pattern information.

Step 404: The structured prediction machine learning modules LM_1-LM_N generate the subset-specific NIC patterns SP_1-SP_N according to the subset-specific patterns F_1-F_N.

Step 406: The output module 306 compares the correlations between the subset-specific NIC patterns SP_1-SP_N to generate the session-specific NIC pattern corresponding to each session channel.

Step 408: End.

Certainly, the detailed operations of the microbatching operation 40 can be refers to FIG. 3 and related paragraphs of the session channel module 30, which is not described hereinafter for brevity. Accordingly, the embodiment of the invention refers to the session-specific NIC pattern of each session channel to correspondingly obtain the plurality of session-specific NIC patterns of the plurality of session channels, and the following operations may be continuously processed by step 204.

In step 204, the central processing unit (or the processing unit or the graphic processing unit) of the embodiment may combine/merge the plurality of session-specific NIC patterns at the application layer to generate the application-specific NIC pattern for the application layer, so as to dispose the scrip information corresponding to the application-specific NIC pattern in the NIC system 12 (i.e. in each NIC) for releasing the attack or invasion of the potential malware. Preferably, the central processing unit may control the application layer to retrieve partial patterns or all patterns from one or many session-specific NIC patterns for generating the application-specific NIC pattern, so as to dispose the script information corresponding to the application-specific NIC pattern in the NIC system 12 for releasing the attack or invasion of the potential malware.

In the embodiment, the application-specific NIC pattern is utilized to recognize the partial or all pattern information of the potential malware, and the script information corresponding to the application-specific NIC pattern is utilized to process filtering, isolating or deleting operations for the recognized partial or all pattern information of the potential malware. Preferably, the embodiment of the invention is not limiting the realization of the filtering, isolating or deleting operations for the recognized partial or all pattern information of the potential malware. For example, the common antivirus operation can be realized via an interactive window or message to tell/notice the user of the computer system 10 that the NIC system 12 connecting to the network NW has detected the potential malware, and the interactive window and message can provide a plurality of selective/operational lists corresponding to the specific potential malware for the user, such that the NIC system 12 can adaptively delete or isolate partial or all pattern information of the potential malware carried/transmitted by electronic files and/or corresponding transmission packets. In another embodiment, the protection process 20 of the invention can provide a cognitive analytic results to inform the user of the computer system 10 that the NIC system 12 is currently attacked by a specific potential malware and a specific antivirus operation corresponding to the specific potential malware is suggested to be processed for releasing the attack and invasion of the specific malware in advance, so as to avoid the situation as the computer systems, mobile devices or electronic files therein being damaged.

Certainly, in another embodiment, when each session channel simultaneously processes the microbatching operation to detect or examine that the transmission packets or the electronic files corresponding to the partial or all pattern information of the potential malware have entered the NIC system 12 and existed in at least one session channel thereof, the embodiment of the invention may dispose the scrip information corresponding to the partial or all pattern information of the potential malware in every plurality of session channels (or in the session channel module 30 of the embodiment), to release the attack or invasion of the potential malware, which is also in the scope of the invention.

In short, the NIC system 12 of the embodiment is cooperated with the protection process 20 and the microbatching process 40, such that the plurality of session-specific NIC patterns corresponding to the plurality of session channels are initially generated, then the application layer refers to the plurality of session-specific NIC patterns for generating the application-specific NIC pattern, and the script information corresponding to the application-specific NIC pattern can be disposed in the NIC system 12 for processing the filtering, isolating or deleting operations against the partial or all pattern information of the potential malware. Certainly, for the sake of operational convenience, the program codes of the protection process 20 and the microbatching operation 40 can be adaptively installed or integrated inside the storage unit of the NIC system 12. Accordingly, once a user initially utilizes his/her electronic device to connect the NIC system 12 for accessing the network NW, the program codes of the protection process 20 and the microbatching operation 40 can be timely operated to process the filtering, isolating or deleting operations for the transmission packets or electronic files of the partial or all pattern information of the potential malware, so as to protect the electronic device from the attack or invasion of the potential malware, which is also within the scope of the invention.

To sum up, the embodiments of the invention provide a protection method and computer system thereof to filter, isolate or delete the pattern information of the potential malware at the NIC system. While one computer module is utilized to process the microbatching operation in each session channel, the input information and the pre-stored pattern information are obtained to process the pattern recombination operation for obtaining the subset-specific pattern information, and the plurality of structured prediction machine learning models are utilized to process the co-learning/training for the plurality of subset-specific pattern information, so as to obtain the session-specific pattern information of each session channel. In the meanwhile, the plurality of computer modules obtains the plurality of session-specific NIC pattern. Accordingly, application-specific NIC pattern is obtained according to the plurality of session-specific NIC patterns, and the scrip information corresponding to the application-specific NIC pattern is disposed in the NIC system to filter, isolate or delete the transmission packets or electronic files of the partial or all pattern information of the potential malware. In comparison with the prior art, the embodiments of the invention can simultaneously refer to the transmission packets in the plurality of session channels, and the plurality of session channels and the plurality of structured prediction machine learning modules in one session channel can share the co-learning/training results, to improve the protection mechanism of the structured prediction machine learning modules against the potential malware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection method utilized for releasing an attack of a malware to a network interface controller (NIC) system, which is coupled to an application layer and comprises a status register, a plurality of NICs and a cluster controller, the protection method comprising:
processing a microbatching operation in a plurality of session channels at at least an operational period according to at least one input information, to generate a plurality of session-specific NIC patterns of the plurality of session channels; and
merging the plurality of session-specific NIC patterns to generate an application-specific NIC pattern at the application layer, so as to dispose a script information corresponding to the application-specific NIC pattern in the NICs for releasing the attack of the malware;
wherein the microbatching operation processes a pattern recombination operation in each session channel to generate a plurality of independent subset-specific NIC patterns, so as to generate the session-specific NIC pattern corresponding to each session channel in view of the plurality of subset-specific NIC patterns;
wherein the step of processing the microbatching operation in each session channel further comprises:
processing the pattern recombination operation to generate an updating pattern information according to the input information and a pre-stored pattern information;
generating the plurality of subset-specific NIC patterns according to the updating pattern information and a plurality of structured prediction machine learning models; and
comparing the plurality of subset-specific NIC patterns to generate the session-specific NIC pattern corresponding to each session channel.

2. The protection method of claim 1, wherein the pattern recombination operation is processed to obtain at least one input pattern information of the input information, so as to merge the at least one input pattern information and the pre-stored pattern information for generating the updating pattern information.

3. The protection method of claim 1, wherein each structured prediction machine learning model further obtains the plurality of subset-specific NIC patterns from other structured prediction machine learning models for assisting a generation of another subset-specific NIC pattern at another operational period.

4. The protection method of claim 1, wherein the step of comparing the plurality of subset-specific NIC patterns to generate the session-specific NIC pattern corresponding to each session channel further comprises:
retrieving partial patterns or all patterns from one or many subset-specific NIC patterns to generate the session-specific NIC pattern corresponding to each session channel according to similarities, overlapping degrees or differences of the plurality of subset-specific NIC patterns.

5. The protection method of claim 1, further comprising:
each session channel further receiving the session-specific NIC patterns corresponding to other session channels for assisting a generation of another session-specific NIC pattern at another operational period.

6. The protection method of claim 1, wherein the step of merging the plurality of session-specific NIC patterns to generate the application-specific NIC pattern at the application layer, so as to dispose the script information corresponding to the application-specific NIC pattern in the NIC for releasing the attack of the malware further comprises:
the application layer further retrieving partial patterns or all patterns from one or many session-specific NIC patterns to generate the application-specific NIC pattern, so as to dispose the script information corresponding to the application-specific NIC pattern in the NIC for releasing the attack of the malware.

7. The protection method of claim 1, further comprising:
disposing the script information in each session channel to release the attack of the malware.

8. The protection method of claim 1, wherein the status register is coupled to the plurality of NICs for recording a plurality of status information of the plurality of NICs, the cluster controller is coupled to the plurality of NICs for turning on or off a plurality of data channels corresponding to the plurality of NICs according to the plurality of status information, a network loading information or a controlling command, and at least one turned-on data channel is utilized to transmit or receive the input information from the application layer.

9. The protection method of claim 8, wherein the plurality of NICs share one data channel, which is utilized to transmit or receive a transmission data from another NIC system.

10. A computer system, coupled to a network interface controller (NIC) system disposed at an application layer for releasing an attack of a malware to the NIC system, the NIC system comprising a status register, a plurality of NICs and a cluster controller, the computer system comprising:

a processing unit; and
a storage device, coupled to the processing unit and storing a program code for processing a protection method, the protection method comprising:
   processing a microbatching operation in a plurality of session channels at at least an operational period according to at least one input information, to generate a plurality of session-specific NIC patterns of the plurality of session channels; and
   merging the plurality of session-specific NIC patterns to generate an application-specific NIC pattern at the application layer, so as to dispose a script information corresponding to the application-specific NIC pattern in the NICs for releasing the attack of the malware;
wherein the microbatching operation processes a pattern recombination operation in each session channel to generate a plurality of independent subset-specific NIC patterns, so as to generate the session-specific NIC pattern corresponding to each session channel in view of the plurality of subset-specific NIC patterns;
wherein the step of processing the microbatching operation in each session channel in the protection method further comprises:
   processing the pattern recombination operation to generate an updating pattern information according to the input information and a pre-stored pattern information;
   generating the plurality of subset-specific NIC patterns according to the updating pattern information and a plurality of structured prediction machine learning models; and
   comparing the plurality of subset-specific NIC patterns to generate the session-specific NIC pattern corresponding to each session channel.

11. The computer system of claim 10, wherein the pattern recombination operation is processed to obtain at least one input pattern information of the input information, so as to merge the at least one input pattern information and the pre-stored pattern information for generating the updating pattern information.

12. The computer system of claim 11, wherein each structured prediction machine learning model further obtains the plurality of subset-specific NIC patterns from other structured prediction machine learning models for assisting a generation of another subset-specific NIC pattern at another operational period.

13. The computer system of claim 10, wherein the step of comparing the plurality of subset-specific NIC patterns to generate the session-specific NIC pattern corresponding to each session channel in the protection method further comprises:
   retrieving partial patterns or all patterns from one or many subset-specific NIC patterns to generate the session-specific NIC pattern corresponding to each session channel according to similarities, overlapping degrees or differences of the plurality of subset-specific NIC patterns.

14. The computer system of claim 10, wherein the protection method further comprises:
   each session channel further receiving the session-specific NIC patterns corresponding to other session channels for assisting a generation of another session-specific NIC pattern at another operational period.

15. The computer system of claim 10, wherein the step of merging the plurality of session-specific NIC patterns to generate the application-specific NIC pattern at the application layer, so as to dispose the script information corresponding to the application-specific NIC pattern in the NIC for releasing the attack of the malware in the protection method further comprises:
   the application layer further retrieving partial patterns or all patterns from one or many session-specific NIC patterns to generate the application-specific NIC pattern, so as to dispose the script information corresponding to the application-specific NIC pattern in the NIC for releasing the attack of the malware.

16. The computer system of claim 10, wherein the protection method further comprises:
   disposing the script information in each session channel to release the attack of the malware.

17. The computer system of claim 10, wherein the status register is coupled to the plurality of NICs for recording a plurality of status information of the plurality of NICs, the cluster controller is coupled to the plurality of NICs for turning on or off a plurality of data channels corresponding to the plurality of NICs according to the plurality of status information, a network loading information or a controlling command, and at least one turned-on data channel is utilized to transmit or receive the input information from the application layer.

18. The computer system of claim 17, wherein the plurality of NICs share one data channel, which is utilized to transmit or receive a transmission data from another NIC system.

* * * * *